(12) United States Patent
Porat et al.

(10) Patent No.: US 10,014,960 B1
(45) Date of Patent: Jul. 3, 2018

(54) METHODS AND SYSTEMS FOR DETERMINING A HUMAN BODY CHANNEL SENSOR POSITION

(71) Applicant: Intel Corporation, Santa Clara, CA (US)

(72) Inventors: Shahar Porat, Geva Carmel (IL); Anand S. Konanur, Sunnyvale, CA (US); Jaroslaw J. Sydir, San Jose, CA (US); Timothy F. Cox, Palo Alto, CA (US); Oleg Pogorelik, Lapid (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,141

(22) Filed: Dec. 30, 2016

(51) Int. Cl.
| | |
|---|---|
| H04B 1/00 | (2006.01) |
| H04B 17/00 | (2015.01) |
| H04B 13/00 | (2006.01) |
| H04L 12/26 | (2006.01) |
| H04W 4/02 | (2018.01) |
| H04B 17/318 | (2015.01) |
| H04W 84/18 | (2009.01) |

(52) U.S. Cl.
CPC ......... *H04B 13/005* (2013.01); *H04B 17/318* (2015.01); *H04L 43/0829* (2013.01); *H04W 4/023* (2013.01); *H04W 84/18* (2013.01)

(58) Field of Classification Search
CPC .............................. H04B 13/005; H04B 13/02
USPC .................................... 455/67.11, 63.1, 226.1
See application file for complete search history.

(56) References Cited

U.S. PATENT DOCUMENTS

| | | | |
|---|---|---|---|
| 8,923,773 B1* | 12/2014 | Gitlin ................. | A61B 1/00016 |
| | | | 455/575.6 |
| 9,479,267 B1* | 10/2016 | Bolin .................. | H04L 63/0492 |
| 9,531,062 B2* | 12/2016 | Park ....................... | H01Q 1/273 |

(Continued)

FOREIGN PATENT DOCUMENTS

| | | |
|---|---|---|
| EP | 2327355 A1 | 6/2011 |
| JP | 2012254112 A | 12/2012 |
| WO | WO 2010073180 A1 | 7/2010 |

OTHER PUBLICATIONS

Cho et al.; "A Planar MICS Band Antenna Combined With a Body Channel Communication Electrode for Body Sensor Network"; IEEE Transactions on Microwave Theory and Techniques; (Oct. 2009); pp. 2515-2522; vol. 57, No. 10; <doi: 10.1109/TMTT.2009.2029952 >.

(Continued)

*Primary Examiner* — Tilahun B Gesesse
(74) *Attorney, Agent, or Firm* — Thorpe North & Western, LLP; David W. Osborne

(57) ABSTRACT

A technology is described for determining a position of a HBC (Human Body Channel) sensor. An example method may include receiving signal data for a radio signal from a first transmitting HBC sensor transmitted over a human body channel. A signal loss of the radio signal can be calculated using the signal data received from the first transmitting HBC sensor, where the signal loss may be a function of distance of the first transmitting HBC sensor from a receiver. A distance of the first transmitting HBC sensor from the receiver can then be determined based in part on the signal loss and a relative position of the first transmitting HBC sensor can be identified based in part on the distance between the first transmitting HBC sensor and the receiver.

23 Claims, 9 Drawing Sheets

(56) References Cited

U.S. PATENT DOCUMENTS

| | | | | |
|---|---|---|---|---|
| 9,743,823 B1* | 8/2017 | Gitlin | ................ | A61B 1/00006 |
| 2010/0106222 A1* | 4/2010 | Lychou | ............. | A61N 1/37276 |
| | | | | 607/60 |
| 2012/0245439 A1* | 9/2012 | Andre | ................ | A61B 5/0205 |
| | | | | 600/310 |
| 2013/0225200 A1* | 8/2013 | Ben Hamida | ........ | H04W 64/00 |
| | | | | 455/456.1 |
| 2015/0087920 A1* | 3/2015 | Johnson | .............. | A61N 1/3925 |
| | | | | 600/301 |

OTHER PUBLICATIONS

International Search Report dated Apr. 5, 2018, in International Application No. PCT/US2018/012002, filed Jan. 1, 2018; 6 pages.

\* cited by examiner

METHODS AND SYSTEMS FOR DETERMINING A HUMAN BODY CHANNEL SENSOR POSITION

BACKGROUND

A wireless body area network (WBAN) may be a wireless network of computing devices that can be worn on the body, embedded inside the body, or carried (e.g., by hand, in a pocket, on an article of clothing, or in a bag). The rapid growth in sensors, low-power integrated circuits, and wireless communication has enabled the development of wireless sensors capable of communicating with one another via a wireless body area network. A number of sensors can be integrated into a wearable wireless body area network, which can be used for a number of different purposes. For example, applications of WBANs can be used in the healthcare domain to continuously monitor health parameters of patients suffering from chronic diseases. Other example applications of WBANs may include: sport applications, military applications, gaming applications, and security applications, as well as others.

WBAN technology may be extended to facilitate exchanges of information between individuals, or between individual and machines. For example, a wireless personal area network (WPAN) may allow for communication that is entirely within, on, or in the immediate proximity of a human body. A WBAN system can use WPAN as a gateway to reach longer ranges. For example, using gateway devices, it may be possible to connect sensors located on the human body to the Internet.

BRIEF DESCRIPTION OF THE DRAWINGS

Features and advantages of invention embodiments will be apparent from the detailed description which follows, taken in conjunction with the accompanying drawings, which together illustrate, by way of example, invention features; and, wherein.

DESCRIPTION OF EMBODIMENTS

Figure 1:
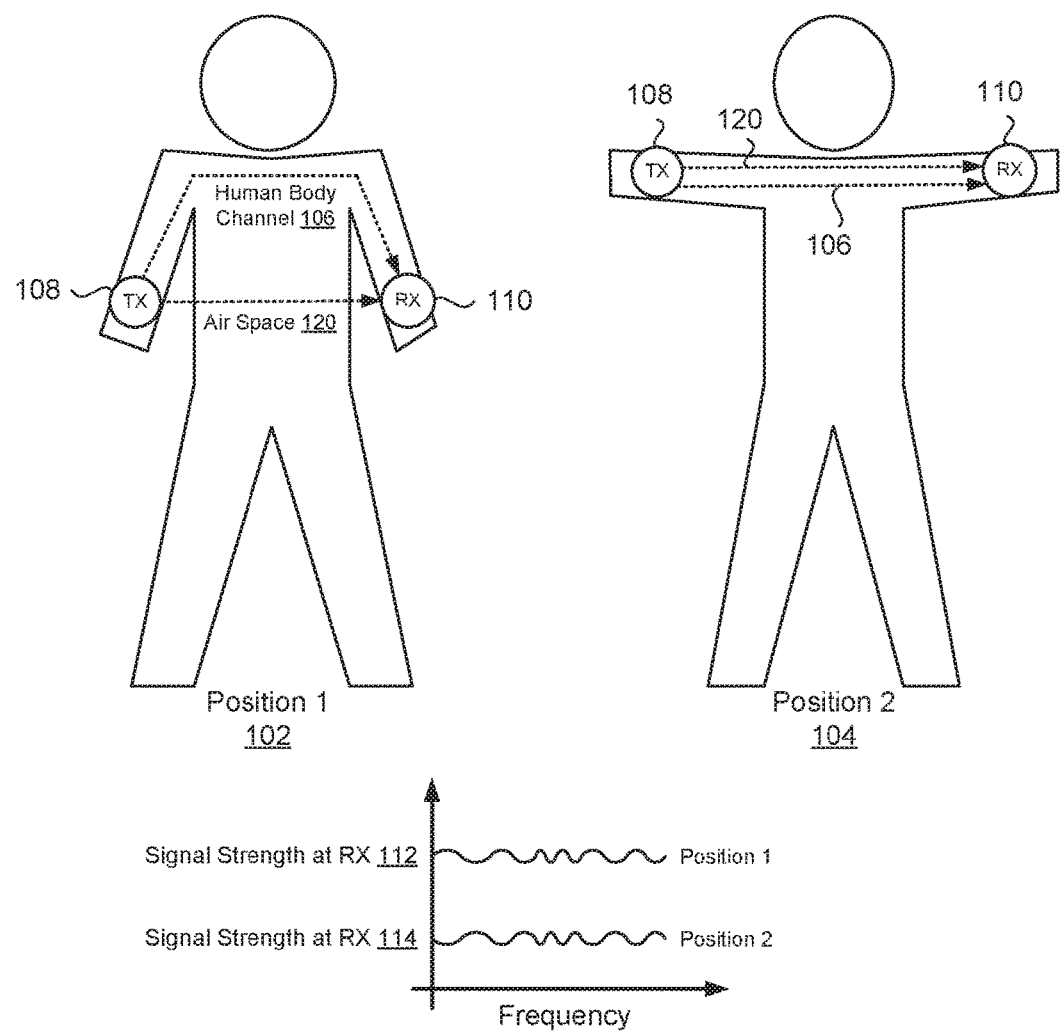
FIG. 1 is a diagram illustrating an example system that includes Human Body Channel (HBC) sensors located on a human body.

Before invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "a network" includes a plurality of such networks.

Reference throughout this specification to "an example" means that a particular feature, structure, or characteristic described in connection with the example is included in at least one invention embodiment. Thus, appearances of the phrases "an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Example Embodiments

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

A technology is described for determining a position of a HBC (Human Body Channel) sensor. A HBC sensor may comprise a radio device configured to transmit and/or receive a radio signal through the human body (or non-human body) used as a transmission medium for the radio signal. HBC sensors may be placed on the skin or in close proximity to the skin (e.g., on or in clothing) and the HBC sensors may communicate wirelessly with one another via a human body channel. Signal data for a radio signal transmitted between HBC sensors can be analyzed to determine a body position of a person wearing and/or holding a plurality of HBC sensors. For example, channel losses between HBC sensors can be analyzed and the channel losses can be used to calculate a distance between the HBC sensors. The distance between the HBC sensors can then be used to determine a position and shape of a person's body.

As part of determining a body position of a person equipped with HBC sensors, additional information about the state of the body can be obtained. For example, a frequency and repetition between body movements can be determined, which can be used to identify gestures and other body movement types, as well as a rate and speed of a body movement. This information can be used in a number of different applications. As one example, the physical activity of a person wearing HBC sensors can be tracked by monitoring a frequency of the person's body gestures. For example, a number and cadence of steps taken by a person can be tracked, or a number of repetitions of an exercise can be tracked. As another example, a body gesture of a person wearing HBC sensors can be identified and the body gesture can be used to control a device. For example, the rate and speed of a body gesture can be used to control a video game, or control the volume of a speaker.

To further describe the technology, examples are now provided with reference to the figures. FIG. 1 is a diagram illustrating a high level example of a system that includes HBC sensors 108/110 located on a human body. In one example, a HBC sensor 108/110 may be a battery operated device having an electrode that can be placed on or near the skin. The HBC sensor 108/110 may include a radio transmitter and/or a radio receiver. For example, a HBC sensor 108/110 can be configured to either transmit or receive a radio signal, or a HBC sensor 108/110 can be configured to both transmit and receive radio signals. A HBC sensor 108/110 may include additional components used to transmit raw signal data to another device (e.g., remote server, mobile device, etc.), as well as components to process signal data and transmit processed signal data to another device, as described in greater detail later.

In the example illustrated, a transmitting HBC sensor 108 and a receiving HBC sensor 110 may be placed on an arm region of a human body (or another region of the human body). Alternatively, the transmitting HBC sensor 108 and the receiving HBC sensor 110 may be held by a user. The transmitting HBC sensor 108 may be configured to transmit a radio signal through a human body channel 106. The radio signal generated by the transmitting HBC sensor 108 may be transmitted through an electrode onto the human body and the human body may provide the human body channel 106 for the radio signal to travel through to an electrode of a receiving HBC sensor 110. In addition to traveling through the human body channel 106, the radio signal may travel through an air space 120 located between the transmitting HBC sensor 108 and the receiving HBC sensor 110, where the radio signal may be detected by the receiving HBC sensor 110.

Signal strength for a radio signal received by the receiving HBC sensor 110 may vary according to a location and position of a transmitting HBC sensor 108 and a receiving HBC sensor 110 on a human body. Attenuation of the radio signal can be used to determine a position of a HBC sensor 108/110. FIG. 1 illustrates a first position 102 and second position 104 for the arms of a human body, on which the HBC sensors 108/110 are located. The first position 102 and second position 104 are used to illustrate differences in signal strength of a radio signal received at the receiving HBC sensor 110 based in part on the position of the arms. The signal strength may be a function of the location of the HBC sensors 108/110 on the arms and a position of the arms between the first position 102 and the second position 104. For example, a signal strength 114 for a radio signal received at the receiving HBC sensor 110 may be lower in the second position 104 as compared to a signal strength 112 for the radio signal in the first position 102 due to changes in the human body channel 106 and the air space 120. The attenuation of the radio signal can be detected using an AGC (Automatic Gain Control) as explained later.

A distance between the HBC sensors 108/110 can be determined by measuring signal losses between the transmitting HBC sensor 108 and the receiving HBC sensor 110 and associating the signal losses with distances. For example, a distance between the HBC sensors 108/110 located on the arms in the first position 102 and the second position 104 can be determined by measuring signal loss that occurs at each of the two positions. The signal loss can then be converted into a distance using a lookup table or formula. For example, a distance lookup table (not shown) for a HBC sensor 108/110 configuration may include signal loss values linked to distance values. The distance lookup table can be queried for a distance value that corresponds to signal loss value. As an illustration, a radio signal received at the receiving HBC sensor 110 may be measured to determine a signal loss in the radio signal and the distance lookup table may be queried for a distance value that corresponds to the signal loss value.

After a distance between the HBC sensors 108/110 has been determined, a relative position of an HBC sensor 108/110 can be determined using the distance. The distance can be converted into a relative position using a lookup table or formula. In one example, a relative position of a transmitting HBC sensor 108 can be determined by querying a position lookup table (not shown) for a position that corresponds to the distance. The position lookup table may include distance values linked to relative position values based on a configuration of the HBC sensors 108/110.

After determining a position of a HBC sensor 108/110, the position can be provided to a device and/or application configured to perform action based in part on the position of the HBC sensor 108/110. As one example, position information for HBC sensors 108/110 can be used to identify body gestures (e.g., hand gestures) and the position information can be provided to a device configured to be controlled by body gestures. As another example, position information for HBC sensors 108/110 can be used to identify repetitive body movements (e.g., walking, running, or lifting) and the position information can be provided to a device configured to track body movements.

Figure 2:
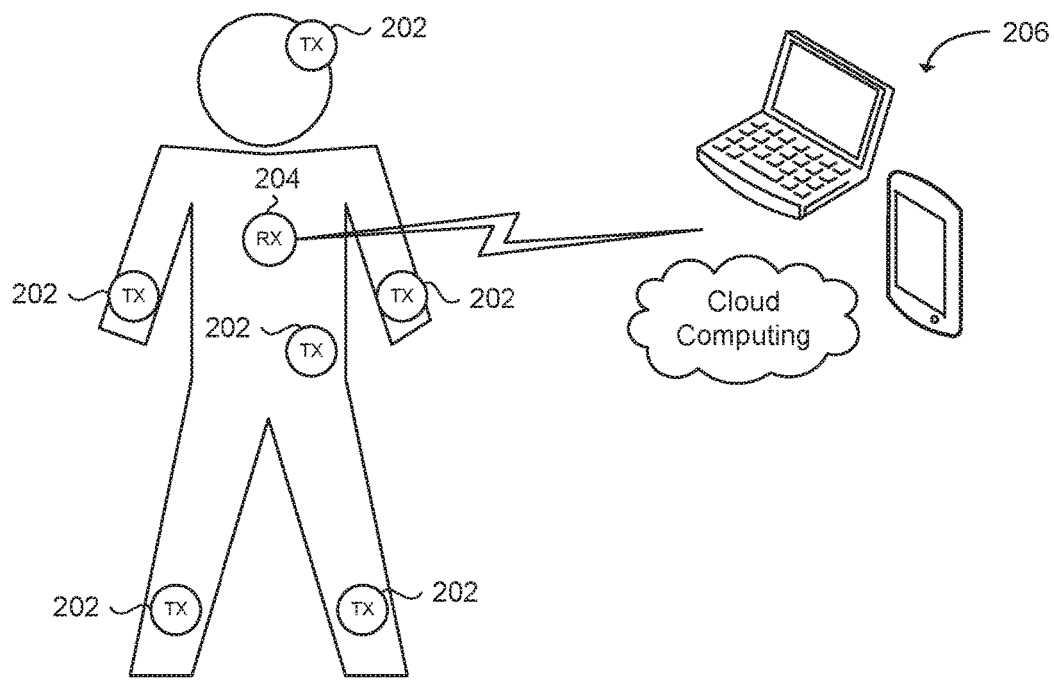
FIG. 2 is a diagram that illustrates an example configuration of transmitting HBC sensors configured to communicate with a receiving HBC transmitter.

Although FIG. 1 shows two HBC sensors 108/110 located on an arm region of a human body, it will be appreciated that any number of HBC sensors can be placed on different regions of a human body and that the position of the HBC sensors can be determined using the methods described herein. Also, various configurations of HBC sensors positioned on a human body are contemplated. For example, HBC sensors 108/110 may be configured to communicate as pairs, or as illustrated in FIG. 2, a number of transmitting HBC sensors 202 can be placed on the body and the transmitting HBC sensors 202 may be configured to communicate with a receiving HBC sensor/transmitter 204 that acts as a hub node for the transmitting HBC sensors as described in greater detail in association with FIGS. 6 and 7. The receiving HBC sensor 204 may provide signal data (or position data) to a device 206 (e.g., computer, mobile device, remote server, etc.) configured to utilize the signal data.

Figure 3:
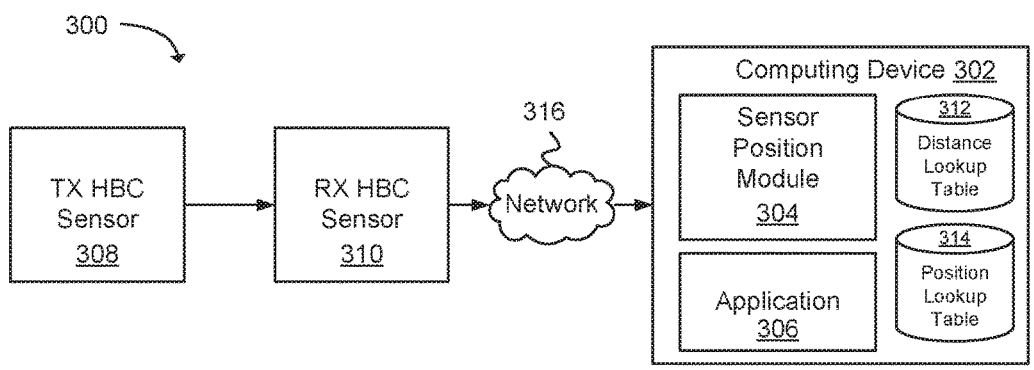
FIG. 3 is a block diagram that illustrates various example components included in a system that includes a computing device upon which processing of signal data can be performed.

FIGS. 3-6 illustrate components of example system configurations that can be used to determine a relative position of an HBC sensor located on a human body. FIG. 3 illustrates components of an example system 300 that includes a computing device 302 upon which processing of signal data for a radio signal may be performed. The computing device 302 can include a remote computing device, such as a mobile device, a computer, or a remote server included in a computing service environment (e.g., cloud computing environment). The system 300 may further include a plurality of HBC sensors 308/310 configured to transmit and receive radio signals via a human body channel and air space located between the HBC sensors 308/310.

As illustrated, a transmitting HBC sensor 308 may be configured to transmit a radio signal as described above in relation to FIG. 1. The radio signal may be received by a receiving HBC sensor 310 configured to send signal data for the radio signal to a computing device 302. In one example, the receiving HBC sensor 310 may include a network interface that enables the receiving HBC sensor 310 to transmit signal data to the computing device 302 via a network 316. Illustratively, the network interface may be configured to use a wireless protocol that includes, but is not limited to: BLUETOOTH, BLE (BLUETOOTH Low Energy), WI-FI, ZIGBEE, NFC (Near Field Communication), and/or cellular network (e.g., 3G, 4G, LTE (Long-Term Evolution), or 5G). Likewise, the network 316 may include any of the above wireless protocols, including an intranet, the Internet, a local area network, a wide area network, a wireless data network, or any other such network or combination thereof. Components utilized for such a network may depend at least in part upon the type of network and/or environment selected.

The computing device 302 may include a sensor position module 304 configured to identify a relative position of an HBC sensor 308/310 using sensor data sent to the computing device 302 by a receiving HBC sensor 310. In one example, raw signal data may be sent to the sensor position module 304 which may be configured to calculate signal loss of the radio signal using the signal data received from the transmitting HBC sensor 310. The signal loss may be a function of distance of a transmitting HBC sensor 308 from the receiving HBC sensor 310. The distance may include a human body channel distance and an air space distance between the transmitting HBC sensor 308 and the receiving HBC sensor 310. The distance may cause attenuation of the radio signal, which varies based on the distance. In another example, the receiving HBC sensor 310 may be configured to calculate signal loss of a radio signal received at the receiving HBC sensor 310 and provide signal loss data to the computing device 302 and the signal loss data may be provided to the sensor position module 304.

In one example, signal loss for a radio signal may be calculated by providing the radio signal (or radio signal data) to an AGC (Automatic Gain Control) circuit (not show) configured to detect attenuation of the radio signal. In one example, a receiving HBC sensor 310 may be configured to include an AGC circuit. In another example, the computing device 302 may include an AGC circuit. The AGC circuit may be implemented in hardware or software. The AGC circuit may be configured to filter a radio signal transmitted by a transmitting HBC sensor 310 and amplify the radio signal to a defined signal strength. More specifically, a signal strength detector (SSD) can be used to measure the radio signal and calibrate the AGC, thereby causing the AGC circuit to amplify the radio signal until the defined signal strength is achieved. The signal loss for the radio signal can then be determined based in part on a difference between the signal strength of the radio signal and the defined signal strength.

As a specific example, a transmitting HBC sensor 308 may send a radio signal (a sinus wave) at −10 dBm at a predetermined frequency. The radio signal may travel over a human body channel and through an air space to reach a receiving HBC sensor 310. The radio signal may be filtered and amplified by the AGC and measured by the SSD. The SSD may calibrate the AGC until a −10 dBm signal is produced. The AGC state may represent signal loss of the radio signal that occurred in transmitting the radio signal from the transmitting HBC sensor 308 to the receiving HBC sensor 310.

The sensor position module 304 may be configured to determine a distance of a transmitting HBC sensor 308 from a receiving HBC sensor 310 based in part on a signal loss as calculated above. In one example, the distance may be obtained from a distance lookup table 312. The distance lookup table 312 may contain a matrix of signal loss values and distance values. The matrix of signal loss values and distance values in a distance lookup table 312 matrix may be specific to a configuration of the HBC sensors 308/310. For example, signal loss data for a HBC sensor configuration can be collected and the signal loss data can be associated with distances between the HBC sensors in various positions. As an illustration, signal loss data associated with a transmitting HBC sensor 308 and a receiving HBC sensor 310 located on a user's wrists can be collected while the user places the user's arms in various positions. Distances between the transmitting HBC sensor 308 and the receiving HBC sensor 310 can be recorded for each position and the distances can be correlated to signal loss data recorded for each of the positions. Because a body type (e.g., age, weight, and height) may affect a correlation between signal loss and distance, distance lookup tables 312 can be created for a number of different body types.

After determining a distance of a transmitting HBC sensor 308 from a receiving HBC sensor 310, a relative position of the transmitting HBC sensor 308 can be determined based in part on the distance. In one example, the relative position may be obtained from a position lookup table 314. The position lookup table 314 may contain a matrix of distance values linked to relative positions. A relative position may be a position of a first HBC sensor with respect to a second HBC sensor. Similar to the distance table 312 described above, the matrix of distance values and relative positions may be specific to a configuration of HBC sensors 308/310, such that a distance value can be correlated to a relative position according to placement of the HBC sensors 308/310 on a user.

In one example, the sensor position module 304 may be configured to provide relative positions for HBC sensors 308/310 to an application 306, computing process, service, or other devices configured to utilize the relative positions for some purpose. As an example, the computing device 302 may host an application 306 configured to track the relative positions of HBC sensors 308/310 and correlate the relative positions with particular body movements and/or body gestures.

In one example, the application 306 may be configured to identify a body gesture based in part on a first position and a second position of a HBC sensor 308/310 provided by the sensor position module 304. As an example, the application 306 may query a body gesture lookup table (not shown) for a body gesture record that includes a sequence of positions that correspond to a sequence of the first position and the second position. Also, the application 306 may be configured to identify a repetitive pattern associated with the body gesture (e.g., waving a hand, running in place, or nodding a head up and down). A rate of change associated with the body gesture over a time period may be calculated. The application 306 may be configured to perform an action that corresponds to the body gesture, or the application 306 may provide a body gesture identifier assigned to the body gesture to a device (e.g., a video game system or audio system) configured to be controlled using body gesture identifiers. As will be appreciated, a number of use cases exist for position data associated with HBC sensors 308/310 as described herein, and these use cases are within the scope of this disclosure.

In some examples, HBC sensors 308/310 may be configured with additional sensors and/or modules that can be used to provide information that supplements positional information obtained from a radio signal. For example, a HBC sensor 308/310 may include, but not limited to: an accelerometer, gyroscope, magnetometer, proximity sensor, barometer, thermometer, pedometer, heart rate monitor, and/or GPS (Global Positioning System) module.

The various processes and/or other functionality contained within the system 300 may be executed on one or more processors that are in communication with one or more memory modules. The system 300 may include a number of computing devices that are arranged, for example, in one or more server banks or computer banks or other arrangements. The computing devices may support a computing environment using hypervisors, virtual machine monitors (VMMs) and other virtualization software.

The lookup tables described above may be stored using data stores. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4:
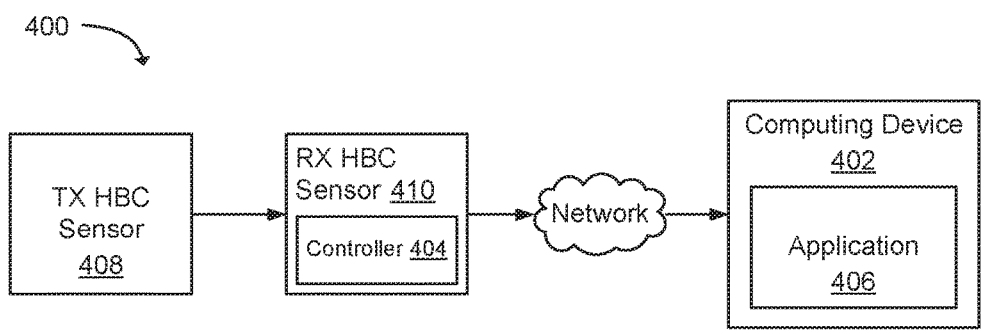
FIG. 4 is a block diagram illustrating components of an example system that includes a receiving HBC sensor configured to identify a relative position of a transmitting HBC sensor.

Moving now to FIG. 4, a block diagram illustrates components of an example system 400 that includes a receiving HBC sensor 410 configured to identify a relative position of a transmitting HBC sensor 408. As illustrated, the receiving HBC sensor 410 can include a controller 404 equipped with a small microprocessor configured to calculate a relative position of a transmitting HBC sensor 408 and send the relative position to another device (e.g., mobile device) using a wireless link (e.g., BLE).

In one example, the controller 404 may include a sensor position module and lookup tables as described above in association with FIG. 3. Accordingly, the controller 404 may be configured to calculate a signal loss for a radio signal transmitted by a transmitting HBC sensor 408 and determine a distance between the transmitting HBC sensor 408 and the receiving HBC sensor 410 based in part on the signal loss. A relative position of the transmitting HBC sensor 408 with respect to the receiving HBC sensor can then be determined based in part on the distance between the transmitting HBC sensor 408 and the receiving HBC sensor 410. The relative position of the transmitting HBC sensor 408 then can be provided to a computing device 402 using the wireless link.

In another example, the controller 404 may be configured to identify a distance between a transmitting HBC sensor 408 and the receiving HBC sensor 410 based in part on the signal loss and sends the distance to the computing device 402, which may be configured to determine a relative position of the transmitting HBC sensor 408 using the distance provided by the controller 404. The computing device 402 may host an application 406 used to track relative positions of a transmitting HBC sensor 408 and correlate the relative positions with particular body movements and/or body gestures as described earlier.

Figure 5:
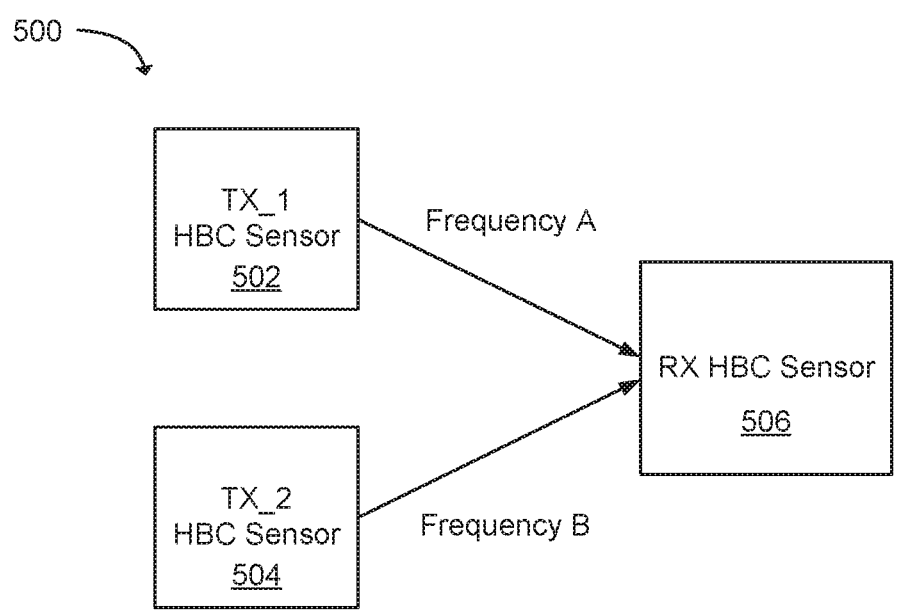
FIG. 5 is a block diagram that illustrates an example system that includes multiple transmitting HBC sensors configured to transmit radio signals over a human body channel using different radio frequencies.

FIG. 5 is a block diagram that illustrates an example system 500 that includes multiple transmitting HBC sensors 502/504 configured to transmit radio signals over a human body channel using different radio frequencies. For example, a first HBC sensor 502 may transmit a radio signal using a first frequency, and a second transmitting HBC sensor 504 may transmit a radio signal using a second frequency. The system 500 may include a receiving HBC sensor 506 configured to detect the radio signals transmitted by the transmitting HBC sensors 502/504 and identify a transmitting HBC sensor 502/504 based on a frequency used by the transmitting HBC sensor 502/504. Multiple transmitting HBC sensors 502/504 may be used to determine a 3-D (three dimensional) position of a transmitting HBC sensor 502/504 based in part on relative positions of the first transmitting HBC sensor and the second transmitting HBC sensor in respect to the receiving HBC sensor 506.

In one example, the receiver 506 may be a dedicated device (e.g., a hub device) used to detect radio signals transmitted by multiple transmitting HBC sensors 502/504 and identify a transmitting HBC sensor 502/504 based on a frequency used by the transmitting HBC sensor 502/504. For example, the receiving HBC sensor 506 may be located on the body as illustrated in FIG. 2. The receiving HBC sensor 506 may use a frequency lookup table to identify a transmitting HBC sensor 502/504 associated with a particular frequency and either determine a relative position of the transmitting HBC sensor 502/504 based in part on a signal loss detected by the receiver 506, or send signal data to a remote computing device configured to determine the relative position of the transmitting HBC sensor 502/504.

Figure 6:
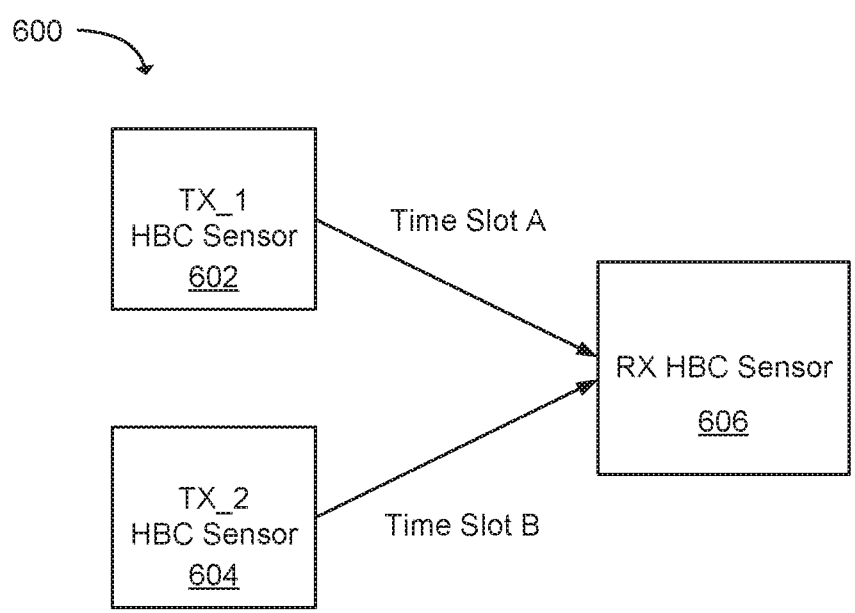
FIG. 6 is a block diagram illustrating an example system that includes multiple transmitting HBC sensors configured to transmit radio signals over a human body channel.

FIG. 6 illustrates an example of a system 600 that includes multiple transmitting HBC sensors 602/604 configured to transmit radio signals over a human body channel. The transmitting HBC sensors 602/604 may be assigned time slots during which the transmitting HBC sensors 602/604 can transmit radio signals. The radio signals may be transmitted using the same frequency. A receiving HBC sensor 606 may be configured to identify a transmitting HBC sensor 602 based in part on a time when a radio signal is received. For example, upon receiving a radio signal, the receiving HBC sensor 606 may correlate the time that the radio signal was received with a time slot assigned to a transmitting HBC sensor 602/604. After identifying the transmitting HBC sensor 602/604, a relative position of the transmitting HBC sensor 602/604 may be determined as described earlier.

Figure 7:
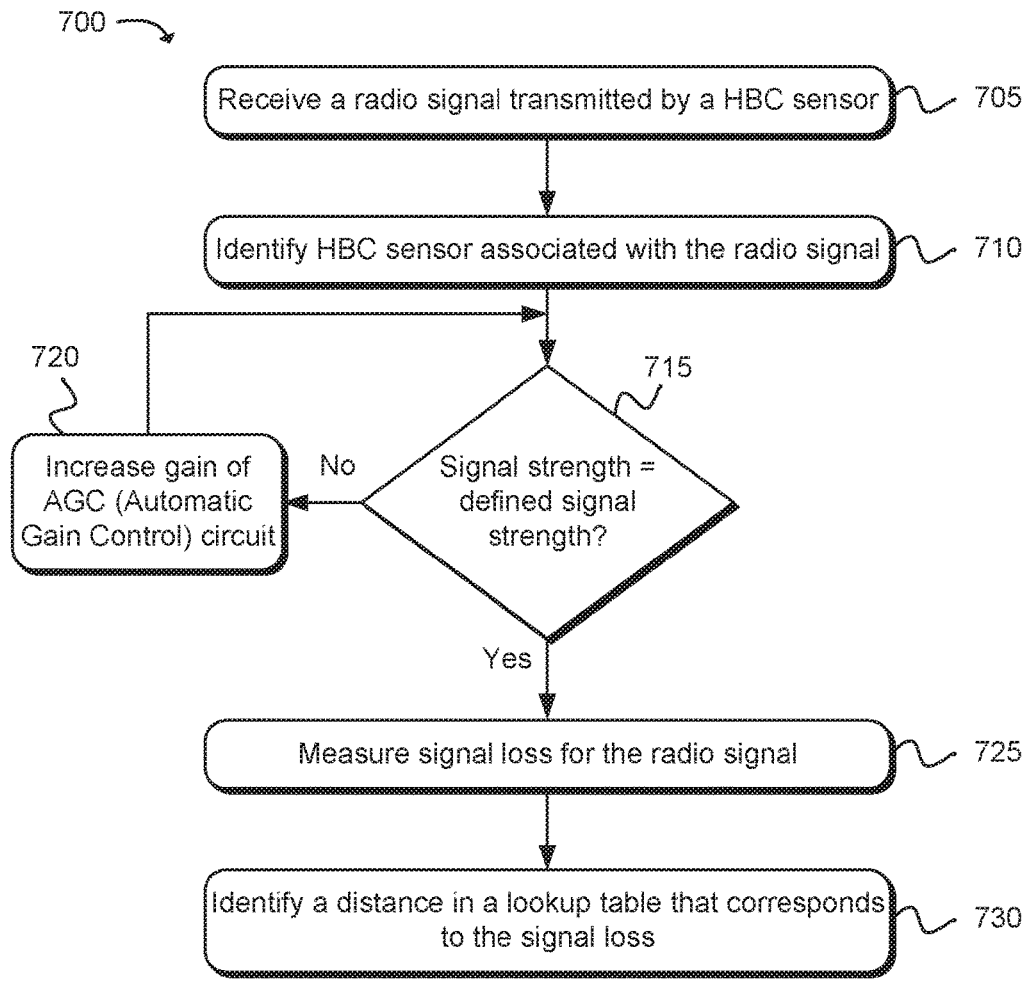
FIG. 7 is a flow diagram that illustrates an example method for identifying a distance of a transmitting HBC sensor from a receiver.

FIG. 7 is a flow diagram illustrating an example method 700 for identifying a distance of a transmitting HBC sensor from a receiver. The distance identified can be used to determine a position of the transmitting HBC sensor relative to the receiver. As in block 705, a radio signal transmitted by the HBC sensor may be detected by a receiver. The radio signal may be transmitted over a WBAN (Wireless Body Area Network) and over an air space between the transmitting HBC sensor and the receiver. In one example, the receiver may be a receiving HBC sensor configured with components used to identify the radio signal and identify a distance of the transmitting HBC sensor from the receiver. The receiver may include an AGC circuit.

As in block 710, the transmitting HBC sensor associated with the radio signal may be identified. In one example, the radio signal may be filtered to identify a radio frequency and the transmitting HBC sensor associated with the radio frequency. For example, in a configuration that includes multiple transmitting HBC sensors, each transmitting HBC sensor may be assigned a frequency that can be used to identify the transmitting HBC sensor. The AGC circuit included in a receiving HBC sensor may be used to filter radio signals.

After identifying the transmitting HBC sensor, a signal strength of the radio signal can be determined. The signal strength may be used to determine a signal loss that occurred in transmitting the radio signal over the WBAN to the receiver. In one example, an SSD and the AGC circuit included in the receiver can be used to measure the signal strength of the radio signal. As in block 715, a determination whether the signal strength of the radio signal is equal to a defined signal strength can be determined. The defined signal strength may be a signal strength used by the transmitting HBC sensor to transmit the radio signal. The signal strength may be measured using the SSD. In the case that the signal strength is not equal to the defined signal strength, then as in block 720, the gain of the AGC circuit may be increased, which increases the signal strength, and the increased signal strength can be measured to determine whether the signal strength is now equal to the defined signal strength. This process may be repeated until the signal strength is equal to the defined signal strength.

Having increased the signal strength to that of the defined signal strength, then as in block 725, a signal loss for the radio signal can be measured. The signal loss may be the amount of gain used to increase the signal strength to the defined signal strength. The signal loss may be used to identify a distance in a lookup table that corresponds to the signal loss, as in block 730. The lookup table may include a matrix of distance values and signal loss values associated with the transmitting HBC sensor and the receiver. Having identified the distance of the transmitting HBC sensor from the receiver, the distance can be used to determine a position of the transmitting HBC sensor in relation to the receiver.

Figure 8:
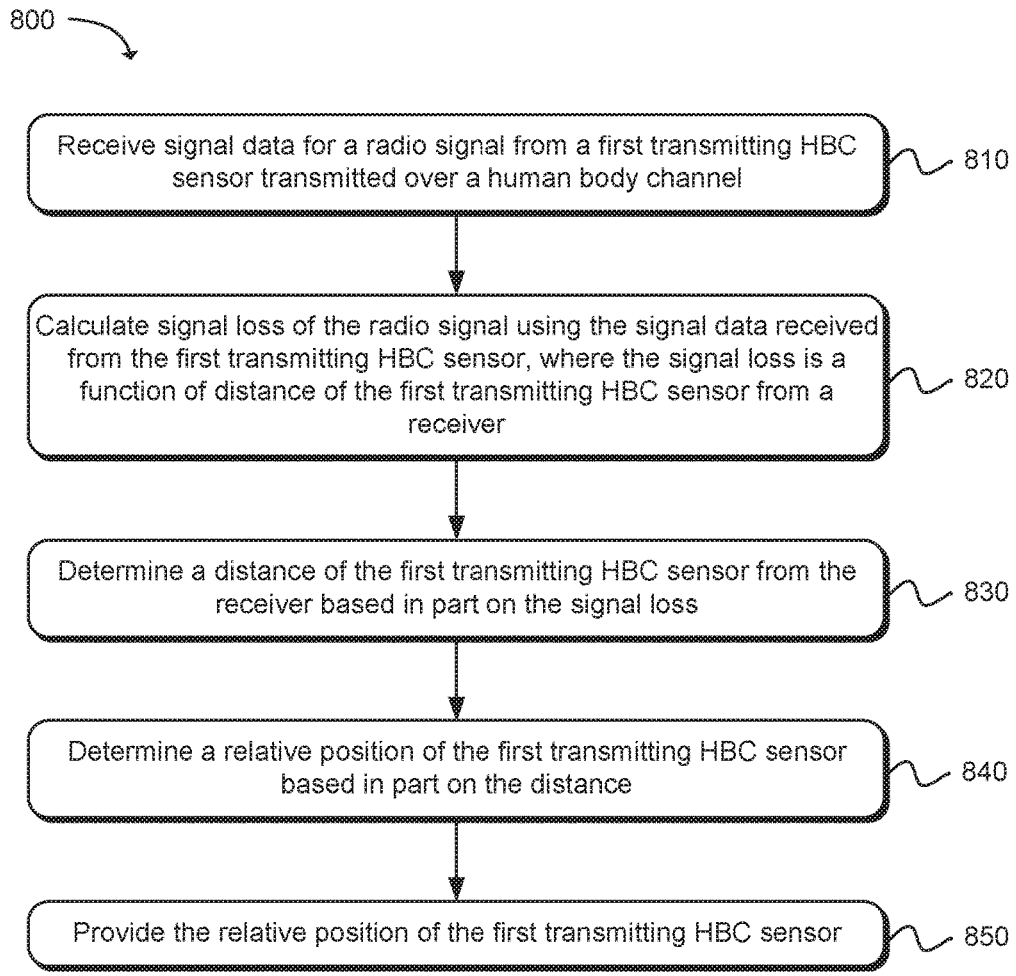
FIG. 8 is a flow diagram illustrating an example method for determining a position of a HBC sensor.

FIG. 8 is a flow diagram that illustrates an example method 800 for determining a position of a HBC sensor. As in block 810, signal data for a radio signal may be received from a first transmitting HBC sensor transmitted over a human body channel. The human body channel may be used to create a WBAN utilized by HBC sensors to send and receive radio signals. The radio signal may also be transmitted over an air space located between the first transmitting HBC sensor and a receiving HBC sensor.

As in block 820, a signal loss of the radio signal may be calculated using the signal data received from the first transmitting HBC sensor, wherein the signal loss may be a function of distance of the first transmitting HBC sensor from a receiver. As in block 830, a distance of the first transmitting HBC sensor from the receiver may be determined based in part on the signal loss. As in block 840, a relative position of the first transmitting HBC sensor may be determined based in part on the distance.

As in block 850, the relative position of the first transmitting HBC sensor may be provided. In one example, the receiving HBC sensor can be configured to transmit the signal data to a remote computing device, such as a mobile device, a nearby computer, or a remote server included in a computing service environment. The receiving HBC sensor can be configured to transmit the signal data to the remote computing device using a wireless network.

Figure 9:
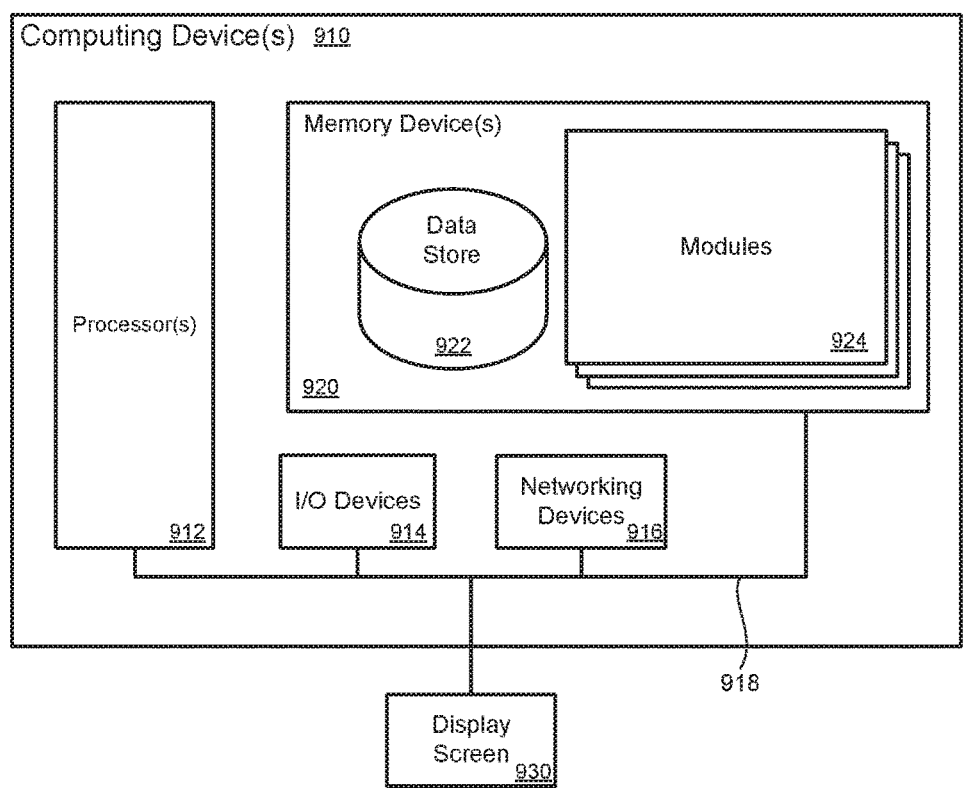
FIG. 9 is block diagram illustrating an example of a computing device that may be used to execute a method for determining a position of a HBC sensor.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. For example, the memory device 920 can include a sensor position module and associated modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device 910 may also have access to I/O (input/output) devices 914 that are usable by the computing device 910. An example of an I/O device is a display screen 630 that is available to display output from the computing device 910. Other known I/O devices may be used with the computing device 910 as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described herein may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

EXAMPLES

The following examples pertain to specific invention embodiments and point out specific features, elements, or steps that can be used or otherwise combined in achieving such embodiments.

In one example there is provided, system for determining a position of a HBC sensor, comprising:
　at least one processor;
　a memory device including instructions that, when executed by the at least one processor, cause the system to:
　　receive signal data for a radio signal from a first transmitting HBC sensor transmitted over a human body channel and an air space located between the first transmitting HBC sensor and a receiver;
　　calculate signal loss of the radio signal using the signal data received from the first transmitting HBC sensor, wherein the signal loss is a function of distance of the first transmitting HBC sensor from the receiver;
　　determine a distance of the first transmitting HBC sensor from the receiver based in part on the signal loss;
　　determine a relative position of the first transmitting HBC sensor based in part on the distance; and
　　provide the relative position of the first transmitting HBC sensor.

In one example of the system for determining a position of a HBC sensor, the memory device includes instructions that, when executed by the processor, cause the system to:
　receive signal data for a second radio signal from a second transmitting HBC sensor transmitted over the human body channel; and
　determine a relative position of the second transmitting HBC sensor based in part on the distance of the second transmitting HBC sensor from receiver.

In one example of the system for determining a position of a HBC sensor, the first transmitting HBC sensor uses a first radio frequency and the second transmitting HBC sensor uses a second radio frequency.

In one example of the system for determining a position of a HBC sensor, the first transmitting HBC sensor uses a first time slot and the second transmitting HBC sensor uses a second time slot to transmit radio signals to the receiver using a same radio frequency.

In one example of the system for determining a position of a HBC sensor, the memory device includes instructions that, when executed by the processor, cause the system to determine a 3-D (three dimensional) position of a transmitting HBC sensor based in part on relative positions of the first transmitting HBC sensor and the second transmitting HBC sensor in respect to the receiver.

In one example of the system for determining a position of a HBC sensor, a HBC sensor includes any of: an accelerometer, gyroscope, magnetometer, proximity sensor, barometer, thermometer, pedometer, heart rate monitor, or GPS (Global Positioning System) module.

In one example of the system for determining a position of a HBC sensor, the receiver further comprises a receiving HBC sensor configured to transmit the signal data to a remote computing device.

In one example of the system for determining a position of a HBC sensor, the remote computing device is a mobile device.

In one example of the system for determining a position of a HBC sensor, the remote computing device is a remote server included in a computing service environment.

In one example of the system for determining a position of a HBC sensor, the receiving HBC sensor is configured to transmit the signal data to the remote computing device using a wireless network.

In one example of the system for determining a position of a HBC sensor, the wireless network includes any of: BLUETOOTH, BLE (BLUETOOTH Low Energy), WI-FI, ZIGBEE, NFC (Near Field Communication), and cellular.

In one example there is provided, a computer implemented method for determining a position of a HBC (Human Body Channel) sensor, comprising:

receiving a radio signal transmitted by a transmitting HBC sensor to a receiving HBC sensor, wherein the transmitting HBC sensor and the receiving HBC sensor are in proximity to a human body epidermis that provides in part a human body channel for the radio signal;

calculating signal loss for the radio signal transmitted by the transmitting HBC sensor to the receiving HBC sensor, wherein the signal loss is a function of a distance between the transmitting HBC sensor and the receiving HBC sensor;

determining the distance between the transmitting HBC sensor and the receiving HBC sensor based in part on the signal loss; and determining a position of the transmitting HBC sensor with respect to the receiving HBC sensor based in part on the distance between the transmitting HBC sensor and the receiving HBC sensor.

In one example of the computer implemented method for determining a position of a HBC sensor, calculating the signal loss for the radio signal further comprises providing the radio signal to an AGC (Automatic Gain Control) circuit configured to detect attenuation of the radio signal.

In one example of the computer implemented method for determining a position of a HBC sensor, the receiving HBC sensor is configured to include the AGC circuit.

In one example of the computer implemented method for determining a position of a HBC sensor, calculating the signal loss for the radio signal further comprises:

providing the radio signal to a AGC circuit configured to:
filter the radio signal transmitted by the transmitting HBC sensor;
amplify the radio signal to a defined signal strength;
measuring a signal strength of the radio signal using a SSD (Signal Strength Detector) circuit configured to calibrate the AGC to generate a defined signal strength; and
determine the signal loss for the radio signal based in part on a difference between the signal strength of the radio signal and the defined signal strength.

In one example of the computer implemented method for determining a position of a HBC sensor, determining the distance between the transmitting HBC sensor and the receiving HBC sensor further comprises querying a lookup table for a distance that corresponds to the signal loss.

In one example of the computer implemented method for determining a position of a HBC sensor, the lookup table includes a matrix of distances between the transmitting HBC sensor and the receiving HBC sensor that correspond to signal loss values.

In one example of the computer implemented method for determining a position of a HBC sensor, the method further comprises providing the position of the transmitting HBC sensor to a computing device configured to perform an action based in part on the position.

In one example of the computer implemented method for determining a position of a HBC sensor, the method further comprises identifying a body gesture based in part on a first position and a second position of the transmitting HBC sensor.

In one example of the computer implemented method for determining a position of a HBC sensor, identifying the body gesture further comprises querying a lookup table for a body gesture record having a sequence of positions that correspond to a sequence of the first position and the second position.

In one example of the computer implemented method for determining a position of a HBC sensor, the method further comprises providing a body gesture identifier assigned to the body gesture to a device configured to be controlled using body gesture identifiers.

In one example of the computer implemented method for determining a position of a HBC sensor, the method further comprises determining a repetitive pattern associated with the body gesture.

In one example of the computer implemented method for determining a position of a HBC sensor, determining the repetitive pattern associated with the body gesture further comprises calculating a rate of change of the body gesture over a time period.

In one example of a non-transitory machine readable storage medium having instructions embodied thereon, the instructions when executed by a processor:

receive signal data for a radio signal associated with a transmitting HBC sensor transmitted over a human body channel;

calculate a signal loss of the radio signal associated with the transmitting HBC sensor using the signal data, wherein the signal loss is a function of distance of the transmitting HBC sensor from a receiver;

determine a distance of the transmitting HBC sensor from the receiver using the signal loss and a distance lookup table, wherein the distance lookup table includes signal loss values linked to distance values;

determine a relative position of the transmitting HBC sensor using the distance and a position lookup table, wherein the position lookup table includes distance values that are linked to relative position values; and provide the relative position of the transmitting HBC sensor.

In one example of the non-transitory machine readable storage medium having instructions embodied thereon, the signal data is received from the receiver and the receiver is attached to a human body.

In one example of the non-transitory machine readable storage medium having instructions embodied thereon, the transmitting HBC sensor is attached to a human appendage and the transmitting HBC sensor is in proximity to a human body epidermis that provides in part the human body channel for the radio signal.

In one example of the non-transitory machine readable storage medium having instructions embodied thereon, the transmitting HBC sensor transmits the radio signal over a WBAN (Wireless Body Area Network) and over an air space between the transmitting HBC sensor and the receiver.

In one example of the non-transitory machine readable storage medium having instructions embodied thereon, the radio signal is received at the receiver via the WBAN and the air space located between the transmitting HBC sensor and the receiver.

What is claimed is:

1. A system for determining a position of a HBC (Human Body Channel) sensor, comprising:
    at least one processor;
    a memory device including instructions that, when executed by the at least one processor, cause the system to:
    receive signal data for a radio signal at a receiving HBC sensor sent from a first transmitting HBC sensor transmitted over a human body channel and an air space located between the first transmitting HBC sensor and the receiving HBC sensor,
    wherein the first transmitting HBC sensor transmits the radio signal through a first electrode onto a human body providing the human body channel and the receiving HBC sensor receives the radio signal through a second electrode in proximity to the human body providing the human body channel;
    calculate signal loss of the radio signal using the signal data received from the first transmitting HBC sensor, wherein the signal loss is a function of distance of the first transmitting HBC sensor from the receiver;
    determine a distance of the first transmitting HBC sensor from the receiver based in part on the signal loss;
    determine a relative position of the first transmitting HBC sensor based in part on the distance; and
    provide the relative position of the first transmitting HBC sensor.

2. A system as in claim 1, wherein the memory device includes instructions that, when executed by the processor, cause the system to:
    receive signal data for a second radio signal from a second transmitting HBC sensor transmitted over the human body channel; and
    determine a relative position of the second transmitting HBC sensor based in part on the distance of the second transmitting HBC sensor from receiver.

3. A system as in claim 2, wherein the first transmitting HBC sensor uses a first radio frequency and the second transmitting HBC sensor uses a second radio frequency.

4. A system as in claim 2, wherein the first transmitting HBC sensor uses a first time slot and the second transmitting HBC sensor uses a second time slot to transmit radio signals to the receiver using a same radio frequency.

5. A system as in claim 2, wherein the memory device includes instructions that, when executed by the processor, cause the system to determine a 3-D (three dimensional) position of a transmitting HBC sensor based in part on relative positions of the first transmitting HBC sensor and the second transmitting HBC sensor in respect to the receiver.

6. A system as in claim 1, wherein a HBC sensor includes any of: an accelerometer, gyroscope, magnetometer, proximity sensor, barometer, thermometer, pedometer, heart rate monitor, or GPS (Global Positioning System) module.

7. A system as in claim 1, wherein the receiving HBC sensor is configured to transmit the signal data to a remote computing device.

8. A system as in claim 7, wherein the receiving HBC sensor is configured to transmit the signal data to the remote computing device using a wireless network.

9. A computer implemented method for determining a position of a HBC (Human Body Channel) sensor, comprising:
    receiving a radio signal transmitted by a transmitting HBC sensor to a receiving HBC sensor, wherein the transmitting HBC sensor and the receiving HBC sensor have electrodes that are in proximity to a human body epidermis that provides in part a human body channel for the radio signal;
    calculating signal loss for the radio signal transmitted by the transmitting HBC sensor to the receiving HBC sensor, wherein the signal loss is a function of a distance between the transmitting HBC sensor and the receiving HBC sensor;
    determining the distance between the transmitting HBC sensor and the receiving HBC sensor based in part on the signal loss; and
    determining a position of the transmitting HBC sensor with respect to the receiving HBC sensor based in part on the distance between the transmitting HBC sensor and the receiving HBC sensor.

10. A method as in claim 9, wherein calculating the signal loss for the radio signal further comprises providing the radio signal to an AGC (Automatic Gain Control) circuit configured to detect attenuation of the radio signal.

11. A method as in claim 9, wherein calculating the signal loss for the radio signal further comprises:
    providing the radio signal to a AGC circuit configured to:
        filter the radio signal transmitted by the transmitting HBC sensor;
        amplify the radio signal to a defined signal strength;
    measuring a signal strength of the radio signal using a SSD (Signal Strength Detector) circuit configured to calibrate the AGC to generate a defined signal strength; and
    determine the signal loss for the radio signal based in part on a difference between the signal strength of the radio signal and the defined signal strength.

12. A method as in claim 9, wherein determining the distance between the transmitting HBC sensor and the receiving HBC sensor further comprises querying a lookup table for a distance that corresponds to the signal loss.

13. A method as in claim 12, wherein the lookup table includes a matrix of distances between the transmitting HBC sensor and the receiving HBC sensor that correspond to signal loss values.

14. A method as in claim 9, further comprising providing the position of the transmitting HBC sensor to a computing device configured to perform an action based in part on the position.

15. A method as in claim 9, further comprising identifying a body gesture based in part on a first position and a second position of the transmitting HBC sensor.

16. A method as in claim 15, wherein identifying the body gesture further comprises querying a lookup table for a body gesture record having a sequence of positions that correspond to a sequence of the first position and the second position.

17. A method as in claim 15, further comprising providing a body gesture identifier assigned to the body gesture to a device configured to be controlled using body gesture identifiers.

18. A method as in claim 15, further comprising determining a repetitive pattern associated with the body gesture.

19. A method as in claim 18, wherein determining the repetitive pattern associated with the body gesture further comprises calculating a rate of change of the body gesture over a time period.

20. A non-transitory machine readable storage medium having instructions embodied thereon, the instructions when executed by a processor:
- receive signal data for a radio signal transmitted from a transmitting HBC sensor over a human body channel to a receiving HBC sensor,
- wherein the transmitting HBC sensor transmits the radio signal through a first electrode onto a human body providing the human body channel and the receiving HBC sensor receives the radio signal through a second electrode in proximity to the human body providing the human body channel;
- calculate a signal loss of the radio signal associated with the transmitting HBC sensor using the signal data, wherein the signal loss is a function of distance of the transmitting HBC sensor from a receiver;
- determine a distance of the transmitting HBC sensor from the receiver using the signal loss and a distance lookup table, wherein the distance lookup table includes signal loss values linked to distance values;
- determine a relative position of the transmitting HBC sensor using the distance and a position lookup table, wherein the position lookup table includes distance values that are linked to relative position values; and
- provide the relative position of the transmitting HBC sensor.

21. A non-transitory machine readable storage medium as in claim 20, wherein the signal data is received from the receiving HBC sensor.

22. A non-transitory machine readable storage medium as in claim 20, wherein the transmitting HBC sensor transmits the radio signal over a WBAN (Wireless Body Area Network) and over an air space between the transmitting HBC sensor and the receiver.

23. A non-transitory machine readable storage medium as in claim 22, wherein the radio signal is received at the receiving HBC sensor via the WBAN and the air space located between the transmitting HBC sensor and the receiver.

* * * * *